United States Patent
Zhang

(10) Patent No.: US 9,729,727 B1
(45) Date of Patent: Aug. 8, 2017

(54) FRAUD DETECTION ON A COMMUNICATION NETWORK

(71) Applicant: iBasis, Inc., Lexington, MA (US)

(72) Inventor: Shuping Zhang, Sudbury, MA (US)

(73) Assignee: iBasis, Inc., Lexington, MA (US)

(*) Notice: Subject to any disclaimer, the term of this patent is extended or adjusted under 35 U.S.C. 154(b) by 0 days.

(21) Appl. No.: 15/355,664

(22) Filed: Nov. 18, 2016

(51) Int. Cl.
*H04M 15/00* (2006.01)
*H04M 17/00* (2006.01)

(52) U.S. Cl.
CPC ........... *H04M 15/47* (2013.01); *H04M 15/41* (2013.01); *H04M 2215/0148* (2013.01); *H04M 2215/0164* (2013.01)

(58) Field of Classification Search
CPC ............ B01J 19/00353; B01J 19/00605; B01J 19/0061; B01J 19/00626; B01J 19/00641; E04F 21/247; G06Q 20/102; G06Q 30/04; G06Q 40/00; G06Q 50/01; H04L 12/14; H04L 12/1413; H04L 63/1416; H04L 63/1425; H04L 65/1089; H04L 65/4053; H04L 65/604; H04M 15/00; H04M 15/06; H04M 15/41; H04M 15/58; H04M 15/47; H04M 2203/6027; H04M 2215/0148; H04M 3/36; H04N 21/4788
USPC ........... 379/114.111, 112.01, 112.04, 112.08, 379/114.01, 114.14, 144.03
See application file for complete search history.

(56) References Cited

U.S. PATENT DOCUMENTS

| | | | |
|---|---|---|---|
| 5,495,521 A * | 2/1996 | Rangachar | H04M 3/36 379/145 |
| 5,627,886 A * | 5/1997 | Bowman | H04M 3/36 379/111 |
| 5,659,593 A | 8/1997 | Tzvieli | |
| 5,732,128 A * | 3/1998 | Bushnell | H04M 15/00 379/116 |
| 6,163,604 A * | 12/2000 | Baulier | H04M 3/36 379/145 |
| 6,590,967 B1 * | 7/2003 | Marchand | H04M 3/38 379/114.14 |

(Continued)

FOREIGN PATENT DOCUMENTS

WO    WO 95/34177 A1    12/1995

OTHER PUBLICATIONS

Baesens et al.; "Fraud Analytics Using Descriptive, Predictive, and Social Network Techniques;" John Wiley & Sons (2015); Hoboken, New Jersey; 179 pages.

(Continued)

*Primary Examiner* — Binh Tieu
(74) *Attorney, Agent, or Firm* — Hamilton, Brook, Smith & Reynolds, P.C.

(57) ABSTRACT

A method and corresponding apparatus for automatically detecting and preventing fraudulent calls on a communication network. At least one example embodiment may include collecting CDRs on the communication network for a given time period, aggregating the plurality of call features for each of the collected call detail records by destination number, and utilizing machine learning to generate a decision model for determining if a destination number and/or a call to that destination number may be fraudulent. According to another aspect of the example embodiment, the decision model may be implemented on the communication network to detect and prevent fraudulent calls.

18 Claims, 10 Drawing Sheets

(56) References Cited

U.S. PATENT DOCUMENTS

| | | | |
|---|---|---|---|
| 6,594,481 B1* | 7/2003 | Johnson | H04L 63/1416 455/405 |
| 7,254,109 B2* | 8/2007 | Verma | H04L 41/069 370/217 |
| 8,738,652 B2 | 5/2014 | Kramer | |
| 9,191,422 B2* | 11/2015 | Tarbox | H04L 65/604 |
| 2002/0188712 A1* | 12/2002 | Caslin | G06Q 20/102 709/223 |
| 2003/0063725 A1* | 4/2003 | Marchand | H04M 15/00 379/114.14 |
| 2006/0013372 A1* | 1/2006 | Russell | H04M 15/06 379/114.14 |
| 2007/0124246 A1* | 5/2007 | Lawyer | G06Q 10/00 705/50 |
| 2008/0267375 A1* | 10/2008 | Betts | H04L 63/14 379/189 |
| 2012/0099711 A1* | 4/2012 | Tully | H04M 3/2281 379/32.01 |

OTHER PUBLICATIONS

Bascacov et al.; "Using Data Mining for Mobile Communication Clustering and Characterization;" IEEE 8$^{th}$ International Symposium on Applied Computational Intelligence and Informatics (SACI); (2013); 6 pages.

Burge et al.; "Frameworks for Fraud Detection in Mobile Telecommunications Networks;" University of London (1996); 9 pages.

Cepêda; "Telecommunication Fraud Detection Using Data Mining techniques;" University of Porto (Jun. 2014); 71 pages.

Ghodsi; "Dimensionality Reduction: A Short Tutorial;" University of Waterloo; Ontario, Canada (2006); 25 pages.

Mendes et al.; "Bi-Level Clustering in Telecommunication Fraud;" *1$^{st}$ International Conference on Operations Research and Enterprise Systems* (ICORES); Coimbra, Portugal; (2012); pp. 126-131.

Mosley, Jr. et al.; "The Use of Analytics for Claim Fraud Detection;" Pinnacle Actuarial Resources Inc.; Bloomington, Illinois; (2014); 15 pages.

Pawar et al.; "A Survey on Outlier Detection Techniques for Credit Card Fraud Detection;" *IOSR Journal of Computer Engineering vol. 16, Issue 2, Version VI*; Mar.-Apr. 2014; Kopargaon, India; pp. 44-48.

Phua et al.; "A Comprehensive Survey of Data Mining-based Fraud Detection Research;" *Artificial Intelligence Review* (2005); Australia; 14 pages.

Wang et al.; "GPCA Method for Fraud Detection in Mobile Communication Networks;" *Proceedings of the 5$^{th}$ WSEAS International Conference on Telecommunications and Informatics*; Istanbul, Turkey (May 2006); pp. 76-79.

* cited by examiner

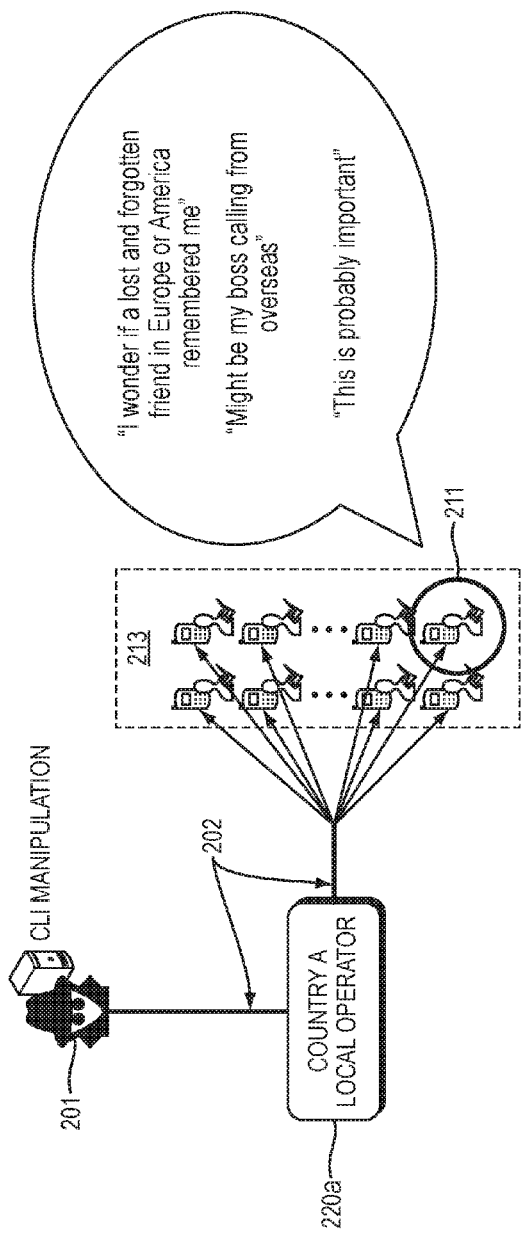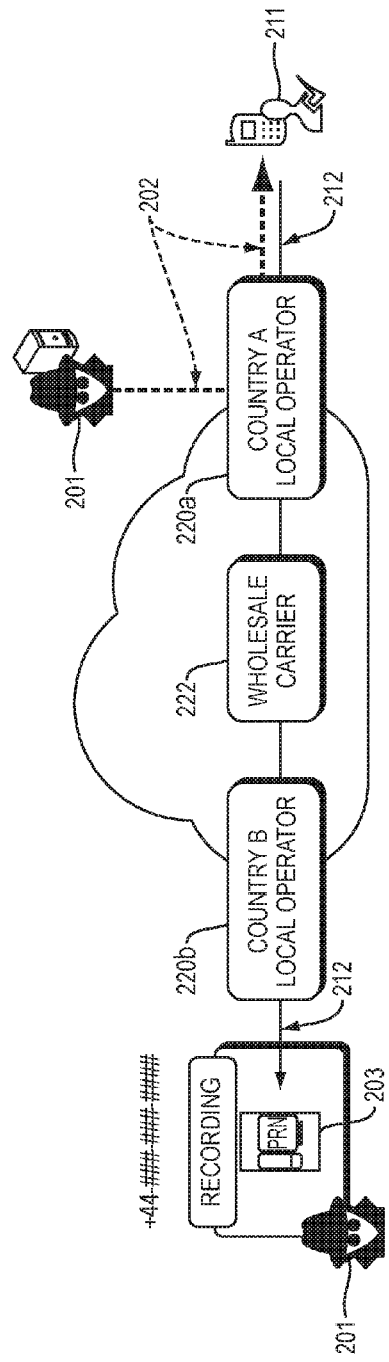

Bonus Networks, Inc.00000000EE60000004E0000000000000128V04.00.00A022 000000000000000000000000000000ACT20130820163606000000000000
START,sbx41,0x0001448A0000000C,26072640 3,GMT+05:30-Calcutta,08/20/2013,11:06:38.7,0,8,10,VoIP,IP-TO-IP,DEFAULT,,,9988002222,0,
,0,,,PER6187_EGRL_1,1,sbx41:PER6187_TG_AS_1,10.54.9.179,10.54.80.7,PER6187_TG_IAD,,10.54.8.179,1046/10.54.80.7.9078,,10.54.9.
179:1046/10.54.80.7:7046,0,,,0x00800002,,,,2,"SIP,i-13231@10.54.80.7,%22sipp%22<sip:sipp@10.54.80.7:7080>;tag=13231SIPpTag001,%22su t%22
<sip:9988002222@10.54.8.179:5060>;tag=gK00800467,0,,,,sip:9988002222@10.54.8.179:5060,,,,,sip:sipp@10.54.80.7:7080,,sip:9988002222@10.
54.8.179:5060,,,,,0,0,,0,0,,,,,,1,0,0,1,,,,,,,,,,,SMM_ING_IN,SMM_ING_OUT",12,12,0,5,,0x0a,9988002222,1,1,,PER6187_TG_AS_1,"SIP,
3_1250327 77@10.54.9.179,%22sipp%22<sip:sipp@10.54.9.179:5060>;tag=gK000005f7,<sip:+9988002222@10.54.80.7:8090;user=phone>;tag=13230,
0,,,,sip:+9988002222@10.54.9.179,0,0,,0,0,,,,,,,1,0,0,1,,,,,,,,,SMM_EGR_IN,SMM_EGR_OUT",,110,,1,1,,2,0x00000003,0,,,,,,0,,,1,,,,,,6,,,,"sipp",
transport=UDP,,,,,,0,0,,0,0,,,,,,,1,0,0,1,,,,,,,,,,,,,,,,,,,,,,,,,,,,,,,,,0,,,,,,,,0,,,,,,,,,,,0,,,,0,,,"90,1,6,97",0,,,,,,,,,,,,,
2,1,1,1,8,,,1,7,1,,,10.54.8.179,10.54.80.7,26,16,8,,,,,,,,0,,TANDEM,,,,,,,,,,,13,1,,,,,,0,,,,,

FIG. 5

FRAUD DETECTION ON A COMMUNICATION NETWORK

BACKGROUND

International telecommunications fraud is a massive problem for the telecommunications industry. Global annual fraud losses were estimated to exceed US $38 billion according to the CFCA Global Fraud Loss survey 2015. Alarmingly, fraud losses are growing at a faster rate than telecom revenues. As fraud grows, many small to mid-size companies are threatened with revenue loss, not having the resources or visibility to monitor fraud full-time.

SUMMARY

Telecommunication network operators are seeking simple, effective and cost-efficient fraud management and prevention technology to reduce and eliminate revenue loss from telecom fraud. Automatically analyzing, detecting and preventing fraudulent calls being placed over a telecommunications network presents multiple technological challenges.

Detecting fraudulent call traffic on a telecommunications network in real time or near real time requires analysis of large amounts of data. Effective detection methods and systems need to perform efficiently, as computational resources are finite. Furthermore, the perpetrators of fraud are constantly changing and adapting how fraud is committed to circumvent detection. Thus, fraud management and prevention technology needs to be flexible and capable of recognizing new fraud activities. Fraud management systems and methods are also required to strike a sensitive balance between aggressively preventing fraudulent calls without interrupting non-fraudulent calls. Detecting and preventing a high percentage of fraudulent calls is not effective if a large amount of legitimate or non-fraudulent calls are also blocked, disrupting customers' telephone service.

Embodiments of the present disclosure are directed to addressing the above-referenced issues of detecting fraud on a telecommunications network by utilizing intelligent analysis of collected call detail records (CDRs). The CDR analysis includes aggregating the call features of the CDRs by destination number, performing a dimension reduction analysis on the call features, and automatically generating at least one decision model to identify fraudulent destination numbers based on the performed analysis. In some embodiments, machine-learning techniques are used to identify fraudulent calls in one or more voice communications networks. These novel combinations of machine-learning techniques produce remarkably precise results in terms of fraud detection accuracy and performance.

According to at least one example embodiment, the present disclosure may be implemented in the form of a method or corresponding apparatus for automatically detecting and preventing fraud on a telecommunications network. The corresponding method or apparatus according to one embodiment of the present disclosure includes collecting CDRs on a communication network for a given time period, each CDR containing a plurality of call features. The embodiment further extracts the plurality of call features, from each CDR, by source number and/or destination number, and may filter the collected CDRs based on one or more predetermined rules to remove the CDRs of apparently non-fraudulent calls (e.g., ostensibly normal calls with absolutely no sign of fraudulent behavior and/or calls that are not meant to be analyzed by the fraud detection system/method). With the apparently non-fraudulent calls removed, the embodiment may then aggregate the plurality of call features for each of the filtered call detail records by destination number, and transform the plurality of aggregated call features for each destination number into data points using a dimension reduction method. In some embodiments, the data points may be visually plotted on a graph.

According to the example embodiment, a clustering analysis is performed that groups the data points into two clusters. In some embodiments, one of the two clusters of data points (each data point representing an aggregation of calls to a single destination number of the given period of time) is used to generate a decision model (i.e., a rule) for determining if a destination number and/or a call to that destination number may be fraudulent. The example embodiment may further identify and report fraudulent calls to the destination number based on the decision model.

According to at least one other example embodiment, the plurality of call features for each of the filtered CDRs is aggregated by a source number and a destination number combination over the given time period.

According to at least one other example embodiment, the decision model is only automatically generated if the centers of the two clusters of destination numbers are a given distance apart. According to at least one other aspect, the automated action may include reporting the identified fraudulent calls to an operator of the telecommunications network, and adjusting the given distance based on feedback from the operator. According to at least one other aspect, the method includes adjusting the at least one decision model based on the adjusted distance, the distance indicative of the likelihood a call is fraudulent.

According to at least one other example embodiment the method further includes automatically blocking calls to destination numbers corresponding to the identified fraudulent calls.

According to at least one other example embodiment the automated action is only performed if a predetermined threshold of fraud to a destination number is reached or exceeded on the telecommunication network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A and 2B are block diagrams illustrating an example Wangiri telecommunication fraud technique.

FIG. 5 is an example CDR.

DETAILED DESCRIPTION

A description of example embodiments of the invention follows.

Embodiments of the present disclosure are able to detect and automatically prevent multiple types of fraudulent calls and schemes on a voice communication network. For a non-limiting example, two types of telecomm fraud are described and illustrated in FIG. 1 (PBX Hacking), and FIG. 2A and FIG. 2B (Wangiri). However, one of ordinary skill would recognize that embodiments of the present disclosure are able to detect and automatically prevent other types of telecomm fraud, including types that exploit International Revenue Share Fraud (IRSF) as the monetization mechanism, such as roaming fraud, subscription fraud, and subscriber identity module (SIM) theft. IRSF is a type of fraud where one or more perpetrators of fraud generate a large amount of voice traffic to premium rate numbers (PRNs). PRNs are telephone numbers that when dialed charge the calling party a fee. Typically, the fee is in the form of an expensive per minute rate. Revenue is generated by the large amount of fraudulent traffic directed to the PRN and that revenue is shared between the local operator and the premium rate number service provider (which is often the perpetrators of fraud themselves).

Figure 1:
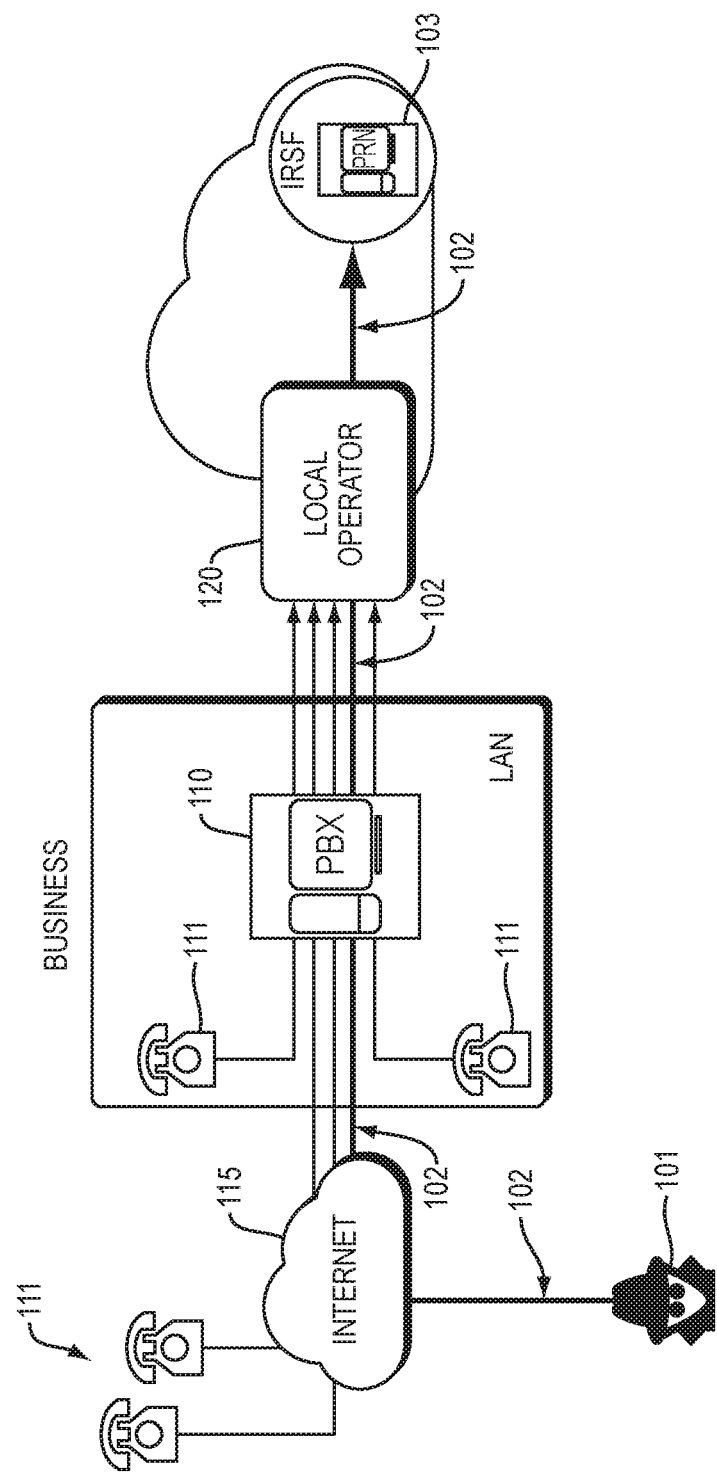
FIG. 1 is a block diagram illustrating an example telecommunication fraud technique involving hacking a private branch exchange (PBX) system.

FIG. 1 is a block diagram illustrating an example telecommunication fraud technique involving hacking a private branch exchange (PBX) system. In a typical non-fraud scenario, business users 111 connect and send voice calls through a corporate PBX (private branch exchange) 110 using the local area network (LAN) while on premises or remotely via the public Internet 115. Using different techniques, perpetrators of fraud 101 illegally gain access to a private PBX 110. For example, these techniques include taking advantage of PBX systems using default passwords, an employee of the corporation with the PBX working with the perpetrators, hacking into the remote service port of a PBX system, and brute force attacks using a PBX's toll-free Direct Inward System Access (DISA) number. Regardless of how access to the PBX is gained, once the perpetrators of fraud 101 gain access to the PBX 110, the perpetrators of fraud 101 use specialized computers (e.g., auto-dialers) to artificially generate large amounts of voice traffic 102 through a local operator 120 to a premium rate number (PRN) 103 (typically, the PRN 103 is an international premium rate number). The auto-dialers are computers that automatically and continuously make calls to specified numbers, in this case PRN 103.

The perpetrators of fraud 101 monetize the call traffic 102 (i.e., telephone calls from the PBX 110) through international revenue share fraud (IRSF), as the local operator 120 charges the business (or the owner of the PBX) for all of the fraudulent calls 102 placed to the PRN 103, and splits the revenue with the PRN service provider. Recently, PBX hacking events have significantly increased, fueled by the migration to IP-based PBXs and their connection to the public Internet 115.

FIGS. 2A and 2B are block diagrams illustrating an example Wangiri (Japanese term meaning "one ring") telecommunication fraud technique. FIG. 2A illustrates perpetrators of Wangiri fraud 201 using auto-dialers to generate thousands (or even millions) of calls to unsuspecting wireless subscribers 213 of one or more mobile operators. The perpetrators of fraud 201 disconnect the calls after one ring, not giving the mobile subscribers 213 enough time to answer. This causes the targeted mobile subscribers 213 to become curious as to who had called them. Some of the mobile subscribers 213, for example mobile subscriber 211, will return the call unknowingly dialing a PRN 203.

The "one ring" calls 202 from the perpetrators of fraud 201 may originate from the PRN 203 itself, resulting in the caller ID of the unsuspecting wireless subscribers 213 to display the PRN 203. Alternatively, the perpetrators of fraud 201 may be located anywhere, including in Country A and/or through the local operator 220a. In this case, the perpetrators of fraud 201 may utilize a caller ID spoofing method that causes the caller ID of wireless subscribers 213 to display the PRN instead of the authentic number the perpetrators of fraud 201 are calling from. In either case, the caller ID of mobile subscriber 211 displays the PRN.

As shown in FIG. 2B, mobile subscriber 211 returns the "one ring" call by dialing the PRN. Mobile subscriber 211's call 212 is routed by the local operator 220a through an international wholesale carrier 222. The wholesale carrier 222 may be, for example, an inter-service provider or a mobile interconnect network. The wholesale carrier 222 routes the call 212 through a local operator 220b in the destination country, which connects the call 212 to the PRN 203. Not coincidentally, the PRN 203 may be leased by the same perpetrators of fraud 201 originating the one-ring calls 202. When the call 212 to the PRN 203 connects, the mobile subscriber 211 hears a recording designed by the perpetrators of fraud 201 to keep mobile subscriber 211 on the line as long as possible.

Mobile subscriber 211 eventually hangs up, but operators along the chain (220b, 222, 220a) pay for traffic that they delivered to partner operators. This is known as the sender-always-pays settlement model. At the end of the billing cycle, the originating operator (Country A Local Operator 220a) bills the mobile subscriber 211 for his voice usage. As a result of returning the "one ring" missed call 202 and connecting to the PRN 203, the mobile subscriber 211 receives an inflated bill. The mobile subscriber 211 will most likely dispute the charge for calling the PRN 203 on his/her bill with the local operator 220a. If many of the other mobile subscribers 213 also returned the "one ring" calls 202, the originating operator 220a could face a significant revenue loss, because of the sender-always-pays settlement model. As seen in this example scenario, Wangiri scam also utilizes International Revenue Share Fraud (IRSF).

Figure 3A:
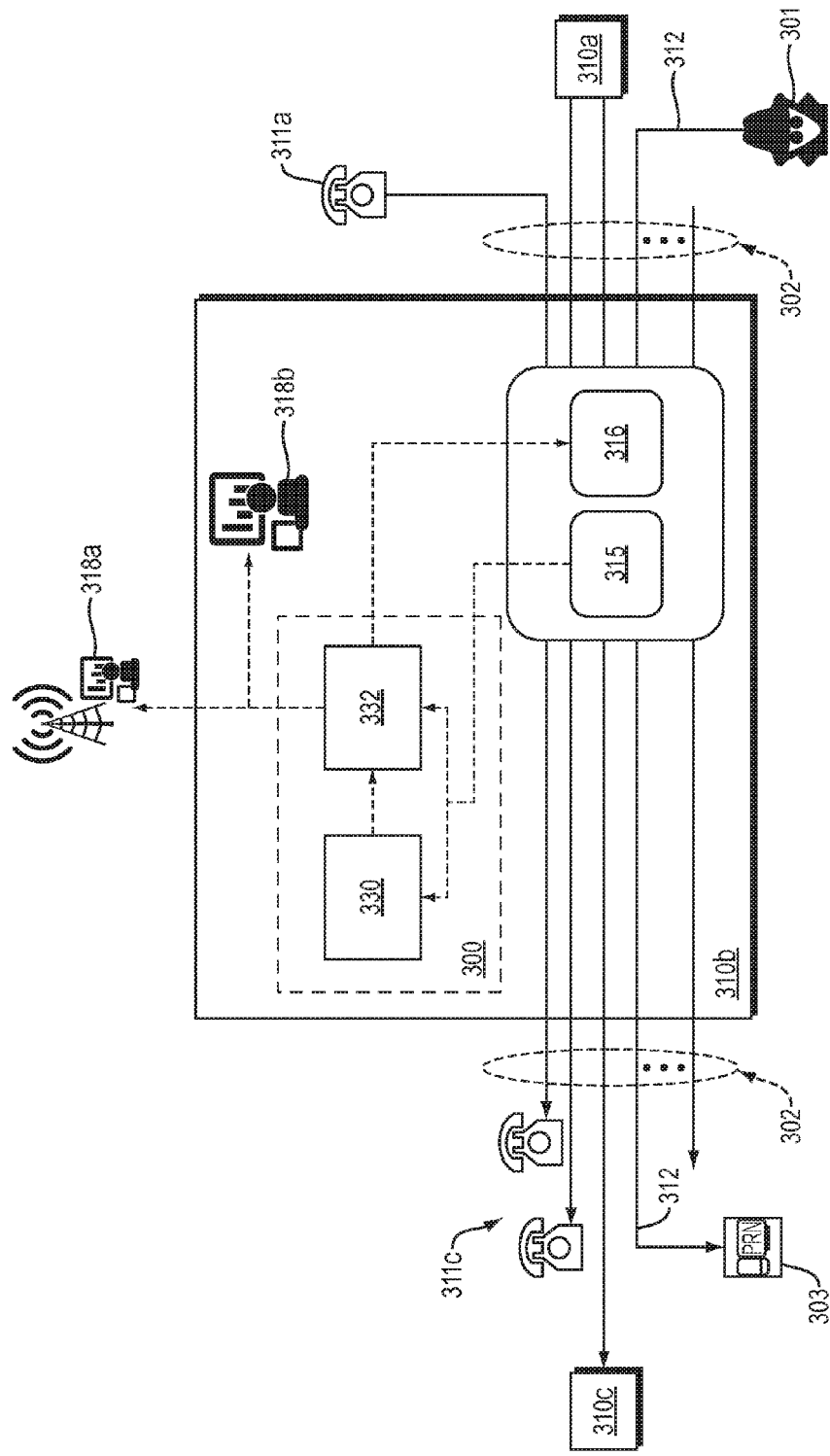
FIG. 3A is a high level block diagram of an example fraud detection and prevention system operating on a voice network.

FIG. 3A is a high level block diagram of an example fraud detection and prevention system 300 operating on a voice network 310b. According to some embodiments, the fraud detection and prevention system 300 includes a fraud analysis module 330 and a fraud detection module 332. In some embodiments, the fraud analysis module 330 receives call detail records (CDRs) from the CDR generation and collection module 315. The CDRs contain information about the calls being connected through the voice network 310b. The fraud analysis module 330 extracts the information from each CDR, aggregates the information, and compiles the aggregated call information into a dataset.

According to some embodiments, the fraud analysis module 330 utilizes unsupervised learning techniques (discussed in detail below) to determine which calls in the dataset are fraudulent. After determining which calls (or aggregations of calls) are fraudulent, the fraud analysis module 330 applies a supervised learning technique to determine a mapping function (i.e., a decision model) that mathematically explains how the input variables (i.e., the aggregated call information) can be used to predict the output variables (i.e., whether the calls are fraudulent). In some embodiments, the fraud analysis module 330 communicates the determined mapping function to the fraud detection module 332.

According to some embodiments, the fraud detection module 332 uses the determined mapping function to detect and prevent fraudulent calls as the calls are being connected through the voice network 310b. In order to utilize the mapping function, the fraud detection module 330 receives CDRs from the CDR generation and collection module 315 and extracts the call information from each CDR. In some embodiments, the fraud detection module 332 inputs the extracted call information for at least one call into the mapping function (determined by the fraud analysis module 330). With the current call information as input, the mapping function outputs a prediction as to whether each call is fraudulent. The fraud detection module 332 may perform an automated action based on the prediction. For example, the fraud detection module 332 may block a call if the call is predicted to be fraudulent.

As described above, the fraud detection and prevention system 300 advantageously separates fraud analysis and fraud detection. In some embodiments, the fraud analysis module 330 requires the compiling of large datasets, and unsupervised and supervised learning techniques are computationally intensive. However, once the fraud analysis module 330 determines a mapping function (i.e., a decision tree, rule, decision model), the fraud detection module 332 can input call information from one or more calls into the mapping function and determine whether the call is fraudulent almost instantly. This enables the fraud detection module 332 to actively detect fraud in real-time.

One of the advantages of the fraud detection and prevention system 300 is its ability automatically and continuously analyze voice traffic to discover new mapping functions for identifying fraudulent calls. As more and more mapping functions are discovered through fraud analysis, the fraud detection and prevention system's ability to detect fraud increases as the combination of mapping functions are used in conjunction. This constant feeding of mapping functions both updates and augments the fraud detection and prevention system's detection accuracy and abilities.

According to the example embodiment shown in FIG. 3A, a voice network 310b receives calls 302 (i.e., call traffic or voice traffic) from other voice networks 310a and/or directly from subscribers 311a, and routes the calls 302 to other voice networks 310c and/or terminates the calls at destination numbers 311c. According to this example, most of the calls 302 are non-fraudulent, but some of the calls 302 are fraudulent (e.g. 312). Fraudulent calls 312 are calls that are being placed by fraudulent perpetrators 301 or at least being caused to be placed by fraudulent perpetrators 301 (see the fraud examples explained above).

According to the example embodiment shown in FIG. 3A, a CDR generation and collection module 315 may be configured to generate and collect CDRs as the calls 302 are being routed through the voice network 310b. In some embodiments, the CDR generation and collection module 315 may be an existing component of the voice network 310b. Alternatively, the fraud detection and prevention system 300 may include a CDR generation and collection module specifically dedicated to generating and collecting CDRs for detecting and preventing fraud.

Figure 4:
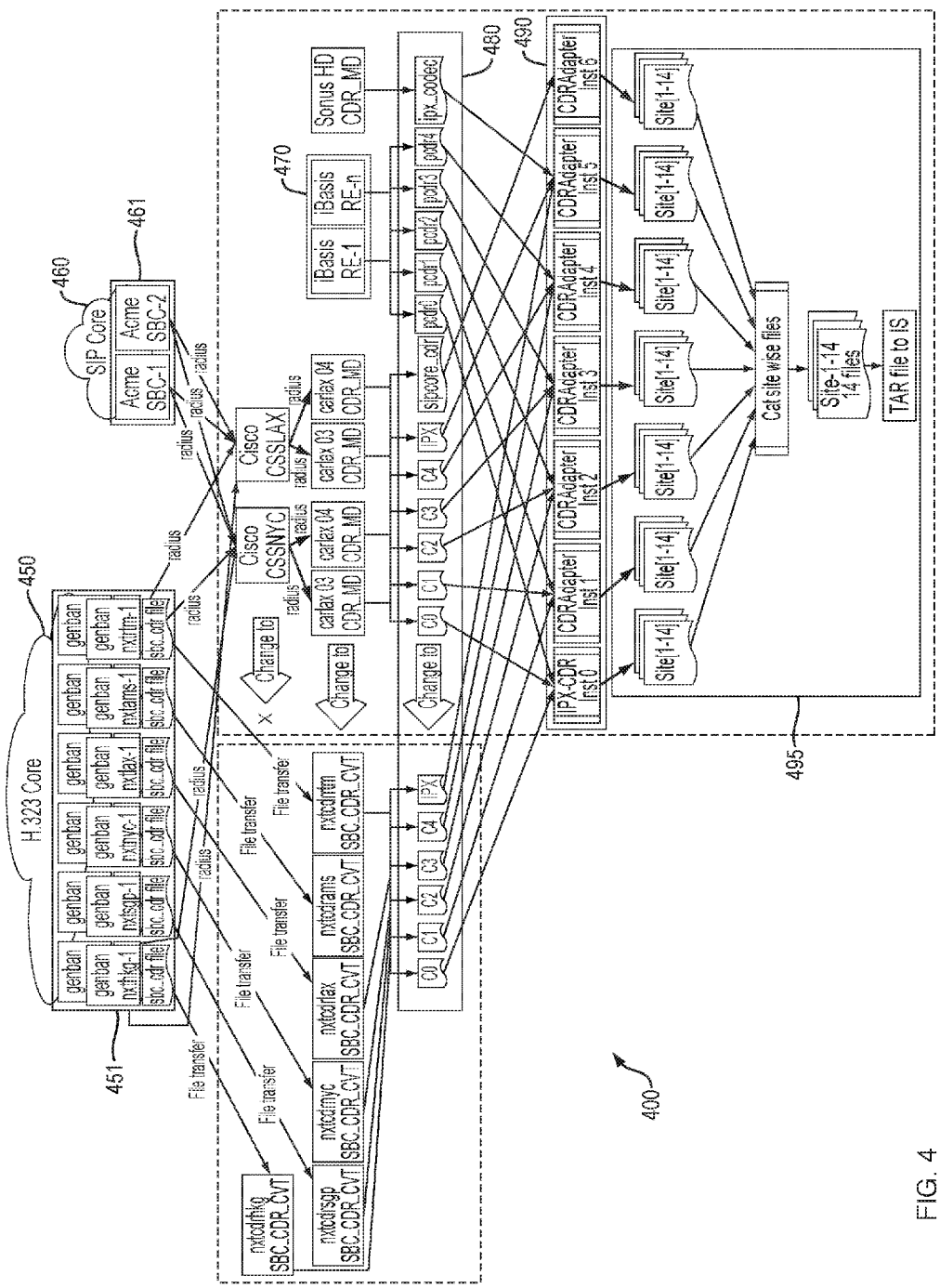
FIG. 4 is a diagram illustrating an example process for call detail record (CDR) collection and mediation on a voice network.

FIG. 4 is a diagram illustrating an example process for call detail record (CDR) generation and mediation on a packet based voice network using packet telephony technologies. Typically, voice networks, (such as voice network 310b) collect information about every voice call from the moment the call enters the network in call detail record (CDR). Through different stages of the call, CDRs of different types are generated, such as connect, reroute, hang-up, disconnect, decline, and final. These CDRs contain a plethora of information about each call, such as, the network sending the call to the current voice network, time of the call, inbound trunk group, outbound trunk group, A-number (ANI), B-number (DNIS), the operator terminating the call, current status of the call, duration of the call, etc. The CDRs are further associated with other information, such as rates, origination and destination locations, originating customer types, etc.

In some embodiments, CDRs are collected from different network elements and may be in different formats. The CDRs from different network elements contain different information about each call. For example, a voice network gateway (GW)/session border controller (SBC) may provide call control information and a voice network gatekeeper (GK)/routing engine (RE) may provide the call routing information. Thus, in order to generate a comprehensive CDR, call information must be converted and combined (mediated) from multiple network elements into a single CDR.

According the example embodiment of FIG. 4, the packet based voice network 400 includes both a H.323 protocol core 450 and a session initiation protocol (SIP) core 460, which enables packet based voice network 400 to interconnect voice networks that use different protocols. In some embodiments, call information is collected from different session border controllers (SBCs) for each protocol, H.323 SBCs 451 and SIP SBCs 461. The call information collected from the SBCs relates to call control information such as duration, release source, and cause code, etc.

In some embodiments, call information is also collected from the packet based voice network's routing engines 470. The call information collected from the routing engines 470 relates to call routing, such as, termination trunk group number, and all translated destination numbers (B-numbers). According to some embodiments, the call information 480 from the SBCs, routing engines, and other sources is combined by CDR adapters 490. The CDR adapters 490 combine and convert the call information 480 from each device and each call into a single CDR. In some embodiments, the CDR adapters 490 may select the call information from the most reliable sources. The CDRs for each call are then compiled 495 together and may be distributed to the fraud analysis module 330 as a single file. Alternatively, the portions of call information 480 of a particular call generated on one or more network components may be sent to the fraud analysis module 330 as real time partial CDR streams.

FIG. 5 is an example of a raw CDR. In some embodiments, CDRs similar to the example CDR of FIG. 5 are processed (i.e., decoded) by a parser to extract and convert the call information into a more human readable form. The example raw CDR of FIG. 5 contains 287 different fields, each field describes an aspect of a single call and the fields are separated by a comma.

Referring back to FIG. 3A, according to some embodiments, after the CDR generation and collection module 315 collects the call information and generates the CDRs, the CDRs are communicated to the fraud analysis module 330.

Figure 3B:
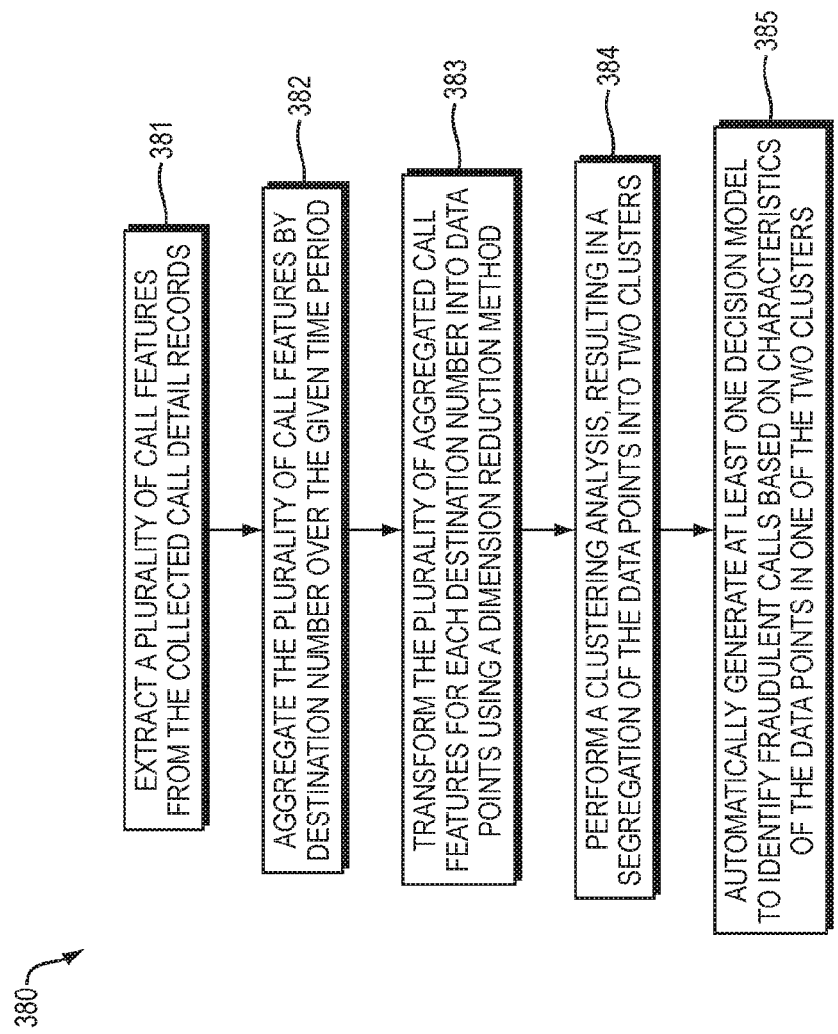
FIG. 3B is a flow chart illustrating a telecommunication fraud analysis method.

According to some embodiments, the fraud analysis module 330 may execute the method 380 shown in FIG. 3B. In some embodiments, the fraud analysis module 330 may be configured to extract 381 a plurality of call features from the collected call detail records, aggregate 382 the plurality of call features by destination number over the given time period, transform 383 the plurality of aggregated call features for each destination number into data points using a dimension reduction method, perform 384 a clustering analysis resulting in a grouping of the data points into two clusters, and automatically generate 385 at least one decision model to identify fraudulent calls based on characteristics of the data points in one of the two clusters.

According to some embodiments, the fraud analysis module 330 may aggregate the CDRs by destination and/or source numbers, and manipulate the information (i.e., call data) contained in the CDRs. In some embodiments, the fraud analysis module 330 receives the generated/collected CDRs and processes the CDRs by extracting call features that are known to be correlated with fraudulent calls. These call features may be known to be correlated with fraudulent calls based on previously performed fraud analysis by the fraud analysis module 330 or from input of human experts.

According to some embodiments, the fraud analysis module 330 may filter the CDRs before analyzing the CDRs and/or extracting call features. This filtering may be accomplished by discarding CDRs that are already known to be fraudulent or non-fraudulent and/or discarding CDRs that are not intended to be analyzed by the system/method. The filtering may be based on a "white-list" of A-numbers or B-numbers that are known to be non-fraudulent, or known combinations of features which indicate a call may be non-fraudulent. Alternatively, the filtering may be based on a "black-list" of A-numbers or B-numbers that are known to be fraudulent. In some embodiments, the CDRs may be filtered using a previously determined decision model (mapping function) to remove calls that are already predicted to be fraud. This allows the fraud analysis module 330 to determine a new decision model to detect fraudulent calls which other decision models may have missed.

According to some embodiments, the fraud analysis module 330 may perform feature engineering to generate additional call features that provide additional input variables for the unsupervised learning algorithm. The generated additional call features (i.e., engineered call features) may be based upon existing information (i.e., call data) in each CDR.

According to some embodiments, the fraud analysis module 330 may collect call data from the CDRs over a given time period, such as the past ten minutes, one hour, two hours, six hours, etc. The collected call data for the given time period may be aggregated by each destination number (B-number). In other words, each type of call feature for a destination number are aggregated together, such that each type of call feature from multiple calls to a destination number could be represented by a single number.

Alternatively, the call data may be aggregated by each originating number (A-number). In some embodiments, the call data may be aggregated over the given time period by a modified A-number or B-number. For example, each call may be aggregated from the past hour according to B-numbers dialed excluding the last two digits.

Figure 6:
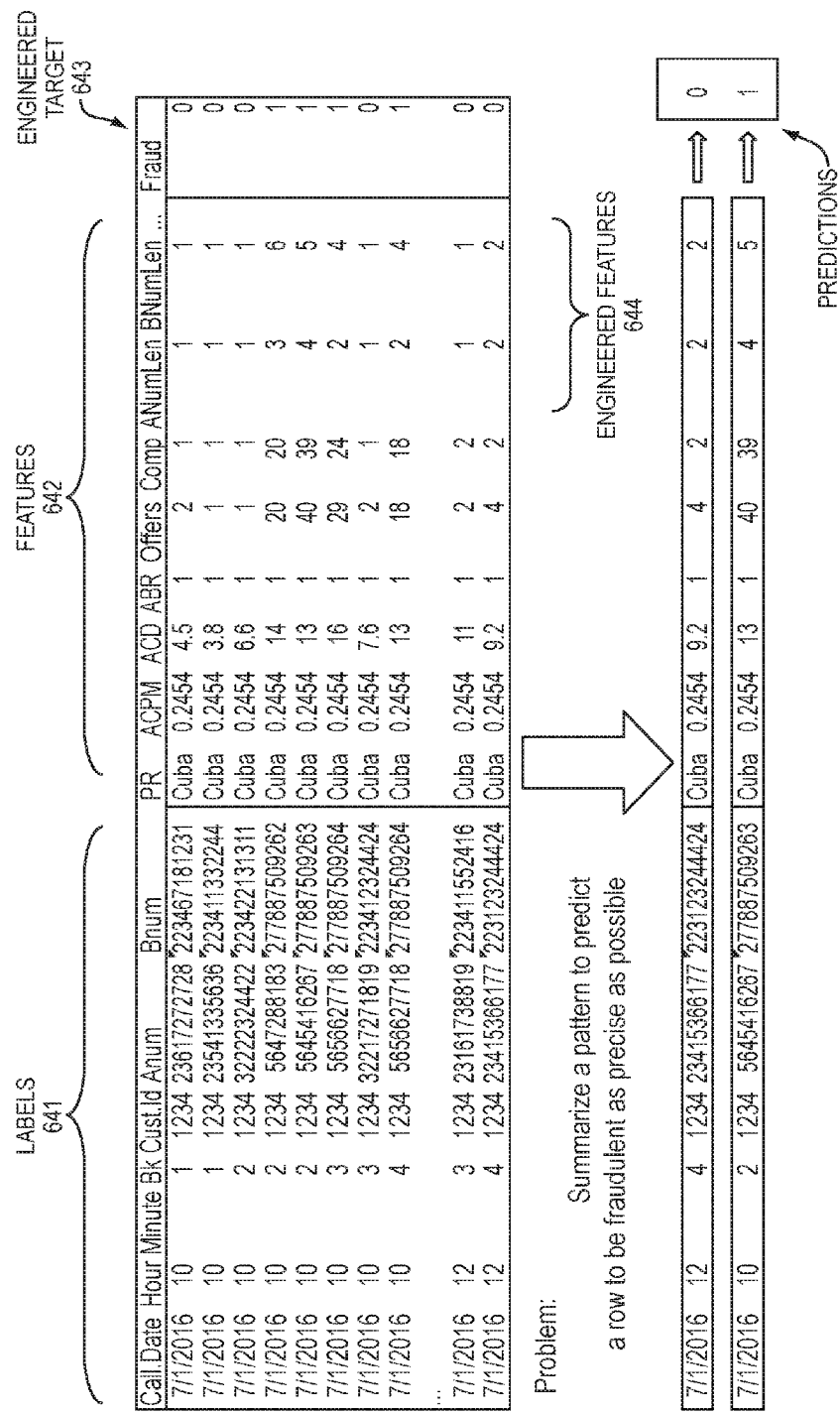
FIG. 6 is an example table organizing call data from each CDR.

FIG. 6 is an example table organizing the aggregated call data from the generated and collected CDRs (each CDR representing a unique call). According to some embodiments, the aggregated call data may be organized into a table. Each row in the table may contain call data aggregated from a plurality of calls or CDRs with a common characteristic. For example, each row may contain aggregated call data from calls to a specific destination number. In some embodiments, the table may have columns holding different types of information relating to each call or aggregated calls, for example labeling columns 641, feature columns 642, and target columns 643.

According to some embodiments, labeling columns 641 may contain fields that uniquely identify each row (i.e., each call or aggregated calls) in the dataset. For example, the labeling columns may include call_date, call_hour, call_minute_bucket, customer_id, A-number, and/or B-number.

According to some embodiments, feature columns 642 may contain the aggregated call features from each CDR to an A-number or B-number. In some embodiments, the feature columns 642 may also include engineered call features 644 generated from the original call features and aggregated in the same manner as the original call features. For example, the feature columns may include Preferred Route (PR), Average Cost per Minute (ACPM), Automatic Call Duration (ACD), Answer Bid Ratio (ABR), Offers, Comp, ANumLen, and BNumLen.

The Preferred Route call feature is a grouping of dial patterns which usually points to a call destination. Offers are calls sent to a carrier from another carrier. Comp represents the number of connected calls. ANumLen represents the number of unique A-numbers that send calls to a particular B-number. BNumLen represents the number of unique B-numbers particular A-number calls.

In some embodiments, the fraud analysis module 330 may transform and standardize the aggregated call features in the feature columns 642. In some embodiments, the fraud analysis module 330 may transform the numerical call features columns from non-normally distributed to normally distributed columns. This transformation may be performed by taking the logarithm of each numerical call feature column. In some embodiments, the fraud analysis module 330 may standardize the transformed normally distributed columns by applying the standard normal distribution formula $$z = \frac{x - \mu}{\sigma},$$

where x is a numerical call feature, $\mu$ is the mean of the aggregated numerical call features, and $\sigma$ is the standard deviation of the aggregated numerical call features.

According to some embodiments, there may be two types of feature columns 642, categorical and numerical, the categorical feature columns containing a non-numeric call feature. In some embodiments, the fraud analysis module 330 may apply a one-hot transformation or one-hot encoding (or a similar method) to the categorical call feature columns to create multiple dummy variables representing each feature category. In other words, the one-hot transformation converts a categorical call feature into a number. The transformed categorical call features, now represented as numbers, may also be standardized depending on the machine learning algorithm to be applied.

According to some embodiments, the fraud analysis module 330 utilizes unsupervised learning techniques (i.e., algorithms) to determine the values to enter in the engineered target column 643. The engineered target column 643 indicates whether the aggregated calls in each row of the dataset are fraudulent, with a 0 indicating the aggregated calls are not fraud and a 1 indicating the aggregated calls are fraud. In some embodiments, the fraud analysis module 330 uses the aggregated call features (and/or labeling columns) as input into an unsupervised learning algorithm (or a combination of unsupervised learning algorithms/techniques) to determine whether or not each row of aggregated calls are fraudulent.

According to some embodiments, the unsupervised learning includes applying a dimension reduction method and a clustering analysis to the aggregated call features. In some embodiments, the fraud analysis module 330 applies a dimension reduction method to the call feature columns 642. In some embodiments, there may be hundreds of call feature columns 642, and some or all of the call feature columns 642 may be important features for determining whether or not a call is fraudulent. Regardless, the amount of call feature columns 642 may be reduced in order to plot each aggregation of calls (i.e., each row) in the dataset on a graph. In other words, the "dimensions" that are being reduced are the call feature columns. The numerous call feature columns are reduced to a predefined amount to be plotted on a graph with the respective amount of dimensions. For example if there are a total of ten feature columns that need to be plotted on a two-dimensional graph, the dimension reduction will reduce the ten feature columns into only two. Each of the two reduced feature columns represent a coordinate of a data point (e.g., (x,y)) that can be plotted on a two dimensional graph.

Assuming fraudulent calls and non-fraudulent calls can be distinguished, the data points of aggregated fraudulent calls and the data points of aggregated non-fraudulent calls will group differently, each having a different center, once plotted on a graph.

In some embodiments, the fraud analysis module 330 performs dimension reduction using Principal Component Analysis (PCA). PCA is a statistical analysis that applies an orthogonal transformation to a set of possibly correlated variables to produce a set of linearly uncorrelated variables called principal components.

According to some embodiments, the aggregated call feature columns are reduced to two or more numbers (i.e., dimensions or principal components), wherein each number is a linear combination of the aggregated feature columns under different weights. The first number (i.e., first principal component) accounts for the largest possible amount of variation in the raw data, and each succeeding number (i.e., other principal component(s)) in turn has the highest variance possible under the constraint that it is orthogonal to the preceding number.

Through dimension reduction, if two call feature columns in the aggregated dataset carry roughly duplicate information, the call feature columns will be reduced to one column, because the other column carries no additional information. Further, call feature columns that carry very unique information will be captured in the principal components. The objective of the dimension reduction (e.g., principal component analysis) is to find a linear combination of call feature columns that force the fraudulent call data points away from the non-fraudulent call data points, resulting in two clusters of data points, each having a different center when graphed on a multi-dimensional plot. The coordinates of each call are the principal components resulting from the dimension reduction.

Figure 7:
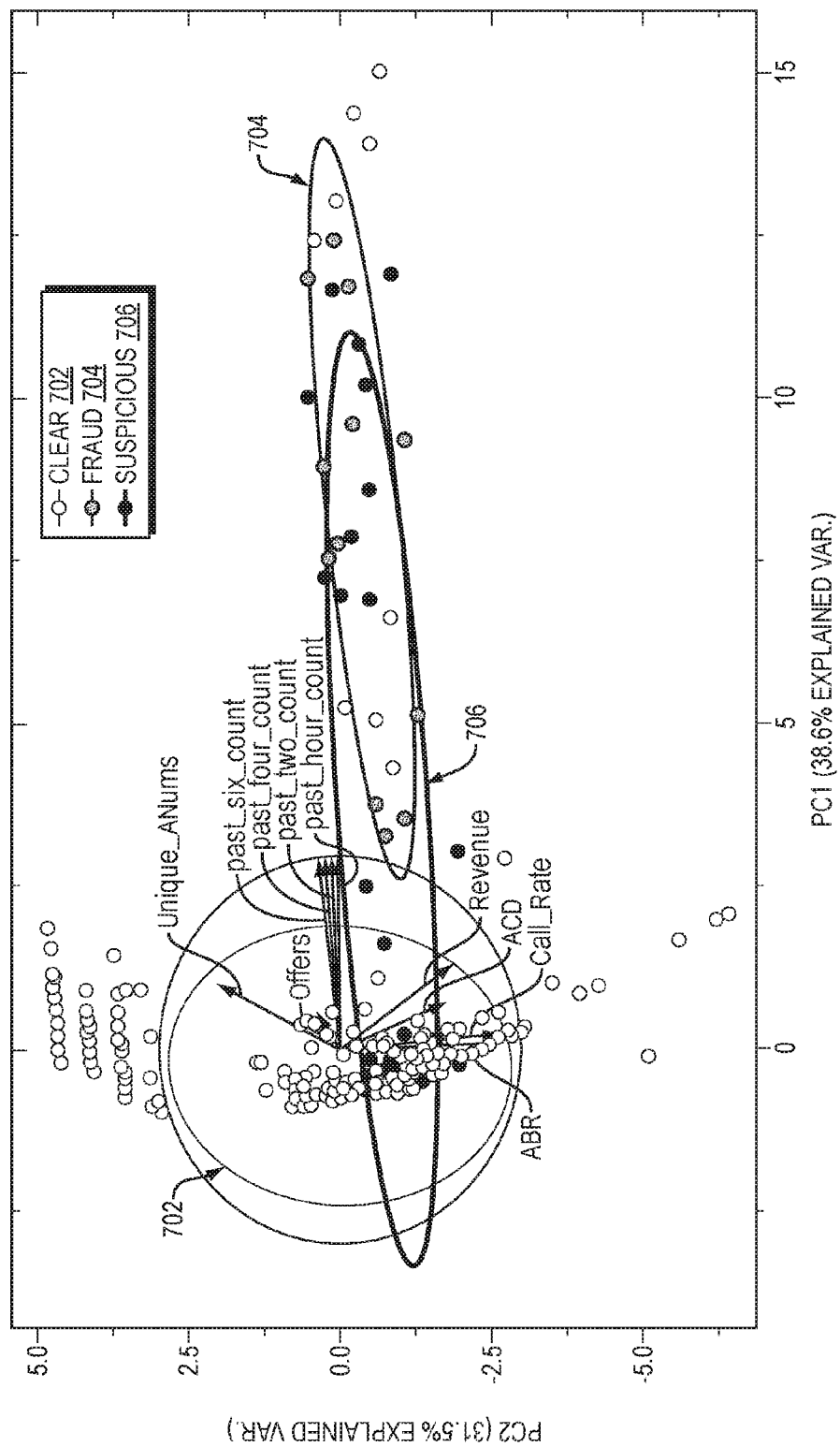
FIG. 7 is an example plot of the call data after dimension reduction has been applied.

FIG. 7 is an example plot of a call dataset after dimension reduction has been applied. In the example plot of FIG. 7, the call feature columns of a dataset have been reduced to into two principal components (i.e., (PC1,PC2) coordinates), the principal components being the x and y coordinates for each data point representing an aggregation of calls to a B-number. As illustrated in the example plot of FIG. 7, the majority of fraudulent calls (green data points) 704 are distant from the grouping of non-fraudulent calls (red data points) 702. In some embodiments, there may be a third grouping of data points representing suspicious aggregations of calls 706.

The non-fraudulent calls (red data points) 702 usually vary in the direction of typical call traffic statistics (variables or call features), such as automatic call duration (ACD), revenue, offers, etc. However, those variables move fraudulent calls (green data points) 704 away from the non-fraudulent calls 702, particularly when effectively incorporated in engineered call features, such as past_six_count. The engineered call feature past_six_count is a counting summary of a particular feature in past 6 hours. Alternatively, engineered features could summarize call features over time by taking the mean or standard deviation of the call features over any predefined time period, such as the past hour or past 2 hours.

The green data points (fraudulent data points) 704 represent aggregations of fraudulent calls that form a group that is nearly perpendicular to the red data points (non-fraudulent data points) 702. The separation of the two data point groups may be amplified by the engineered call features accounted for in the reduced dimensions (e.g., principal components). In other words, something in the fraudulent call behavior that has nothing to do with normal traffic fluctuation may be amplified in the engineered call features. The engineered call features may have a high level of variance when the calls are fraudulent, thus the dimension reduction analysis captures that high variance and reflects it in the value of the reduced dimensions (e.g., principal components). This causes the location of fraudulent call data points 704 to be different relative to non-fraudulent call data points 702.

For example, among different types of call features, offers and revenue may be particularly related to whether a call is fraudulent. As shown in FIG. 7, offers and revenue are not exactly orthogonal (90 degrees) to fraud features, but are almost orthogonal (~75 degrees). This indicates that when fraud occurs, perpetrators of fraud tend to send lots of offers and aim for an increase in revenue. This is understandable, as perpetrators of fraud are going after revenue through a wave of increased offers.

According to some embodiments, the fraud analysis module 330 may generate the engineered target column by applying a clustering algorithm (or method) to the dimension reduced data points. In some embodiments, the fraud detection module may utilize a clustering algorithm, such as the k-means clustering algorithm, to cluster the dimension reduced data points into two groups of data points. The clustering algorithm identifies the cluster each data point belongs to. As shown in FIG. 7, the non-fraudulent data points 704 fall into one cluster (red data points), and the fraudulent data points 702 fall into another cluster (green data points).

This method of clustering the data points is effective except in certain scenarios, for example, when the non-fraudulent data points are from more than one call traffic profile. This may occur, for example, when a mobile operator is mixing call center traffic (intrinsically very low duration and large number of calls from the same A-number) with retail traffic (long duration), and sending the mixed traffic to the voice network 310b. This results in three clusters, call center call traffic, retail call traffic, and fraudulent call traffic. If these 3 clusters are forced into two clusters, the call center traffic may be clustered with the fraudulent call traffic. This can be avoided by carefully choosing feature columns or generating engineered call features correlated more to fraud than to non-fraudulent traffic patterns. Thus, the chance that a different call profile has been clustered as fraud is controllable through manipulation of the call features analyzed by the dimension reduction algorithm.

According to some embodiments, the fraud analysis module 330 determines the result of the principal component analysis, and finds the direction of the non-fraudulent data points. If most of the other data points fall along the perpendicular of the direction of the non-fraudulent data points, the fraud analysis module 330 assigns them to the fraudulent cluster. The fraud analysis module is able to complete the dataset (shown in FIG. 6) by assigning a value to the engineered target column 643 for each row based on which cluster the data point (representing a row) is grouped in.

As stated above, the engineered target column 643 indicates whether the aggregated calls of a particular row are fraudulent or not. In other words, if the data point (representing a row of the dataset in FIG. 6) is part of the non-fraudulent cluster, the data point is assigned a "0" as its engineered target, and if the data point is part of the fraud cluster, the data point is assigned a "1" as its engineered target. With the dataset complete, the aggregated call features and the engineered target can be used as input values and output values, respectively, (collectively training data) for a supervised learning algorithm that produces a mapping function (i.e., a decision model).

According to some embodiments, the fraud analysis module 330 may produce the decision model if the two clusters of data points are a given distance apart. The distance between the two clusters of data points can be calculated by finding the location of each of the clusters' center and then calculating the distance between the two center points with the formula, $$\text{distance} = \sqrt{(x_2 - x_1)^2 + (y_2 - y_1)^2}.$$

If all the call features are scaled and normalized before the dimension reduction is performed, the units of the distance between the two center points should be within 0 to $2\sqrt{2}$. The distance between the center of the "fraud" cluster and the center of "non-fraud" cluster is an indicator of the likelihood that the data points in the "fraud" cluster represent an aggregation of fraudulent calls. By requiring a minimum distance between the two clusters, the sensitivity of the fraud detection decision model may be adjusted. For instance, if too many non-fraudulent calls are being identified as fraudulent the minimum distance between the clusters may be lengthened.

According to some embodiments, the fraud analysis module 330 applies a supervised machine learning algorithm to the completed dataset to produce a decision model for determining if a call is fraudulent. The decision model or mapping function describes how the input (i.e., the aggregated call features) determine the output value (i.e., non-fraud or fraud). One type of decision model or mapping function is a decision tree.

Figure 8:
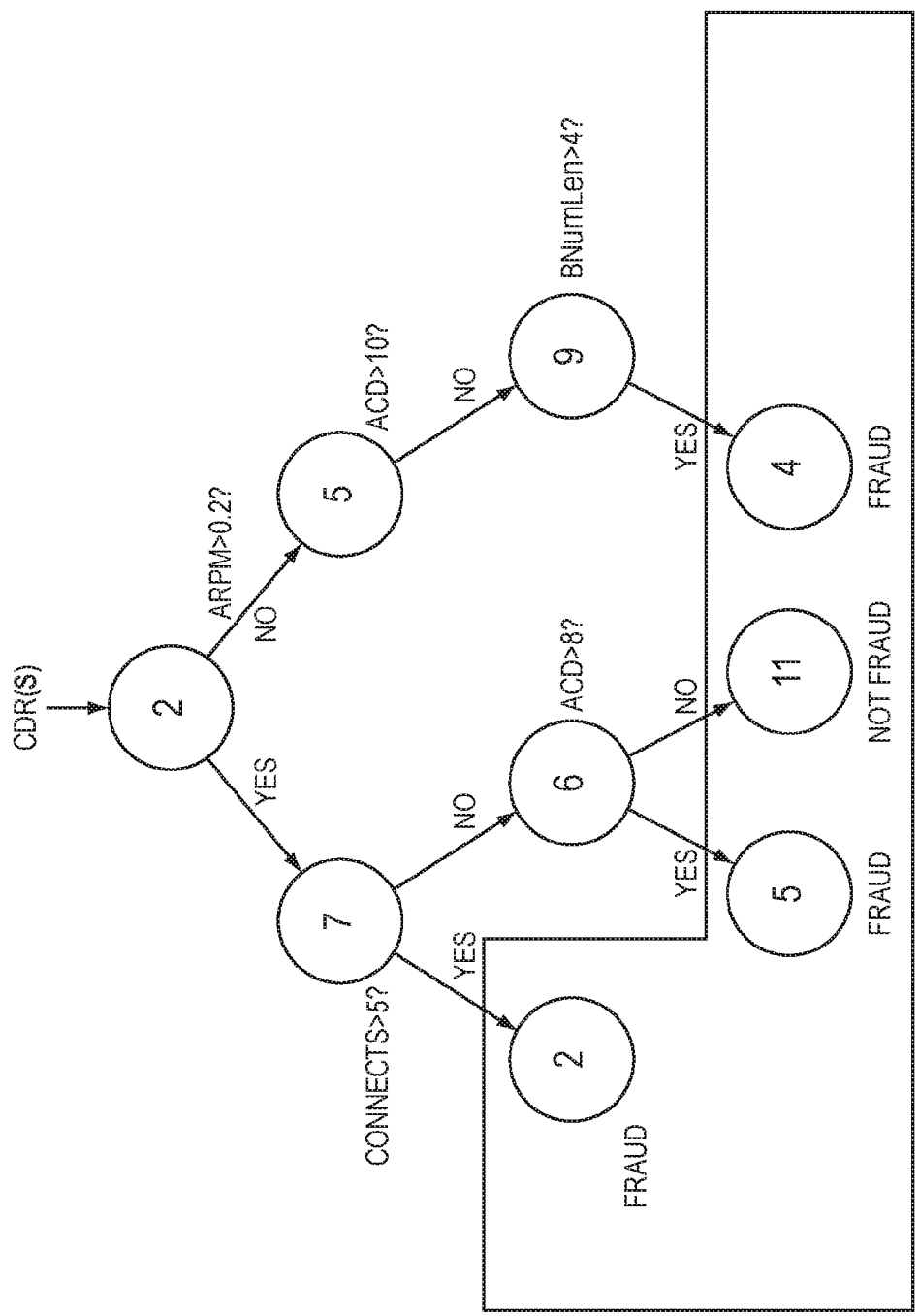
FIG. 8 is an example decision tree model for predicting whether a call is fraudulent.

FIG. 8 is an example decision tree for predicting whether a call is fraudulent using the call features ARPM, ACD, Connects, and BNumLen. In general, decision tree learning is a type of supervised learning that generates a decision tree. A decision tree is a type of decision model used to map observations (e.g., aggregated call features) about a target variable to conclusions about the target variable's value (e.g., fraud or not fraud). Using several input values (e.g., call features) the decision tree can predict the value of a target variable (e.g., fraud or not fraud). The decision trees can also be represented as a series of "if-statements" which lead to a conclusion as to whether a call is fraudulent.

For example, the decision tree shown in FIG. 8 may be used to determine if a CDR of a single call is fraudulent. Alternatively, an aggregation of calls may be applied to the decision tree to determine if the aggregation of calls is fraudulent. Each node of the decision tree corresponds to an expression for evaluating a call feature. The evaluation of the expression determines which expression is evaluated next. For instance, if the call feature ARPM is greater than 0.2, then the next expression to be evaluated is the expression corresponding to the node at the end of the yes branch. The expression corresponding to the node at the end of the yes branch asks if the call has greater than 5 connections. If the answer to that expression is yes, then the call is fraudulent. If the answer to that expression is no, then an additional expression needs to be evaluated, namely is the ACD of the call greater than 8. Accordingly, the decision tree can be described as an ordered series of "if statements," where the answer to the proceeding "if statement" determines the next "if statement." The decision tree eventually ends in predicting if a call is fraudulent or not.

In some embodiments, the fraud analysis module 330 may use a cross-validation method to select training and testing data points to generate a decision tree model for predicting when calls are fraudulent. One of the advantages of using a decision tree as the prediction model is the decision tree visually explains the decision/prediction process. Thus, the decision tree can be cross checked with domain experts (i.e., telecom fraud experts). However, in some embodiments, the prediction model may be generated using other machine learning algorithms, such as support vector machines (SVM), logistic regression, etc. In some embodiments, the fraud analysis module 330 may use a boosting method to aid the accuracy of the decision model.

Referring back to FIG. 3A, according to some embodiments, the fraud analysis module 330 may communicate the generated decision model (or the rules determined from the decision model) to the fraud detection module 332. In some embodiments, the fraud detection module 332 may use the decision model or the rules determined from the decision model to predict which calls in the call traffic 302 are fraudulent.

According to some embodiments, the fraud detection module 332 may apply the decision tree (or fraud screening rules derived from the decision tree) to CDRs in a batch processor to generate fraud alerts in real-time or pseudo real-time. In some embodiments, the fraud detection module 332 may alert the voice network's operator 318b and/or the originating voice network's operator 318a that one or more calls have been detected as fraudulent. The alert may be a report containing information necessary to identify the call, for instance, the call labels.

In some embodiments, the fraud detection module 332 utilizes a streaming platform to expediently process CDRs as calls are being connected. For example, the streaming process may process CDRs in a sliding window of time. A sliding window of time is a moving time period of the same length of time, for example, sliding window of 1 hour collected every 10 minutes can be 4:00 PM to 5:00 PM, 4:10 PM to 5:10 PM, 4:20 PM to 5:20 PM, 4:30 PM to 5:30 PM etc. For instance, the processing may take place every few seconds. Due to the nature of voice traffic (e.g., call traffic 302), which can be separated into separate data streams, in some embodiments, the fraud detection module 332 may process separate data streams on a parallel computing environment, such as Hadoop.

According to some embodiments, the fraud detection module 332 may receive CDRs of calls 302 currently (or within a short period of time) being connected through the voice network 310b from CDR generation and collection module 315. In some embodiments, the fraud detection module 332 may filter CDRs that do not need to be processed to determine if the calls are fraudulent. The filtering may discard CDRs that are already known to be fraudulent or non-fraudulent. For example, the filtering may be based on a "white-list" of A-numbers or B-numbers that are known to be non-fraudulent, or known combinations of call features which determine the call to be non-fraudulent. Alternatively, the filtering may be based on a "black-list" of A-numbers or B-numbers that are known to be fraudulent.

According to some embodiments, the fraud detection module 332 may extract call features from the filtered CDRs and generate any necessary engineered call features. In some embodiments, the fraud detection module 332 may apply one or more decision models (e.g., the decision tree of FIG. 8) previously generated by the fraud analysis module 330 to the call features (both extracted and generated) from the current call traffic 302. As a result of application of the one or more decision models to the call features of each call, the fraud detection module 332 determines which calls are fraudulent and which calls are non-fraudulent.

According to some embodiments, the fraud detection module 332 may cause the voice network 310b's call filtering module 316 to filter or block calls that are determined to be fraudulent by the fraud detection module 332 to prevent the fraudulent calls (e.g., call 312) from continuing and/or being connected.

For example, the fraud detection module 332 may receive CDRs corresponding to the current call traffic 302 from the CDR generation and collection module 315, including the CDR for call 312. According to this example, call 312 is a fraudulent call being placed by a perpetrator of fraud 301 to the premium rate number (PRN) 303. The fraud detection module 332 may determine call 312 is a fraudulent call by processing the data from the call 312's CDR and apply the processed data to one or more decision models generated by the fraud analysis module 330. The processing may include parsing call 312's CDR, generating one or more engineered call features from the parsed information, and applying the parsed information and generated call features to the decision model for determining if a call is fraudulent.

According to this example, once the fraud detection module 332 completes the processing of call 312's CDR and determines the call is fraudulent, the fraud detection module 332 may automatically cause the call filtering module 316 to disconnect the fraudulent call 312 or prevent the call from being connected to its destination (PRN 303) or a subsequent voice network. Alternatively, the fraud detection module 332 may automatically alert the voice network's operator 318b and/or the originating voice network's operator 318a that call 312 has been detected as fraudulent. In some embodiments, the voice network operators 318a and 318b may receive the fraud alerts and confirm whether or not the calls fraudulent. The fraud analysis module 330 may utilize the confirmation data from the voice network operators 318a and 318b to generate one or more decision models based on the call features and confirmed engineered targets. These one or more decision models may also be utilized by the fraud detection module 332 to detect and prevent future fraudulent calls.

According to some embodiments, the fraud detection module 332 may have an adjustable threshold of how many calls must be detected as fraud to a B-number or from a A-number before an automated action (e.g., blocking calls to the B-number or from a A-number, or reporting fraudulent calls to the voice network operators 318a and 318b) is performed. For example, the fraud detection module 332 may detect or predict a call to a B-number is fraudulent and continue to monitor calls to that B-number for fraud until an adjustable threshold is reached. The adjustable threshold may be a predefined amount of fraudulent calls to a B-number or from an A-number, and/or an amount of monetary charges accumulated from the combined calls to a premium rate B-number.

According to some embodiments, based on the confirmation data from the voice network operators 318a and 318b, the minimum distance between the two clusters may be adjusted resulting in a decision model that is more or less sensitive to fraud. For instance, if there are too many false-positives of fraudulent calls the minimum distance may be increased, and if there are too many false-negatives the minimum distance may be decreased.

According to some embodiments, the fraud detection module 332 may periodically update the one or more decision models provided by the fraud analysis module 330 to account for newly discovered data correlations that signal fraud and/or to account for a change in strategy of the perpetrators of fraud. In some embodiments, the fraud analysis module 330 and/or the fraud detection module 332 may compare the previous decision models with a newly calculated decision model, to identify a major fraud pattern change.

Embodiments of the present disclosure utilize novel combinations of different technologies in data science to assemble rich datasets with necessary features for fraud detection and prevention. Using a dimension reduction method to determine engineered target variables for each row of an aggregated dataset table transforms the fraud detection problem into a supervised learning problem to generate a decision model.

Further, embodiments of the present disclosure improve upon existing telecommunication fraud detection systems by continuously and automatically analyzing voice traffic over a given period of time to generate a decision model (e.g. decision trees) which can be applied to identify fraudulent calls. While, a separate but connected, fraud detection process is utilizing previously generated decision models to detect fraudulent calls in the current voice traffic. It is this combination of "big data" fraud analysis and fraud detection that enables the fraud detection and prevention system to automatically adapt to changes in the behaviors and strategies of perpetrators of fraud faster than previously possible. As processing technology's performance improves, this detection process may be performed almost instantaneously.

Several aspects of the present disclosure directly improve computer functionality. For instance, embodiments of the present disclosure achieve faster fraud analysis and detection times with smaller memory and processing requirements by performing a pre-processing filtering step that filters out apparently non-fraudulent or fraudulent calls.

Additionally, the step of aggregating the data from multiple CDRs so that multiple calls may be represented in a single row of a data table reduces the amount of data to be analyzed in the processor demanding dimension reduction, clustering, and machine learning processes. The aggregated data requires less computer resources while also improving fraud analysis and detection performance.

Figure 9:
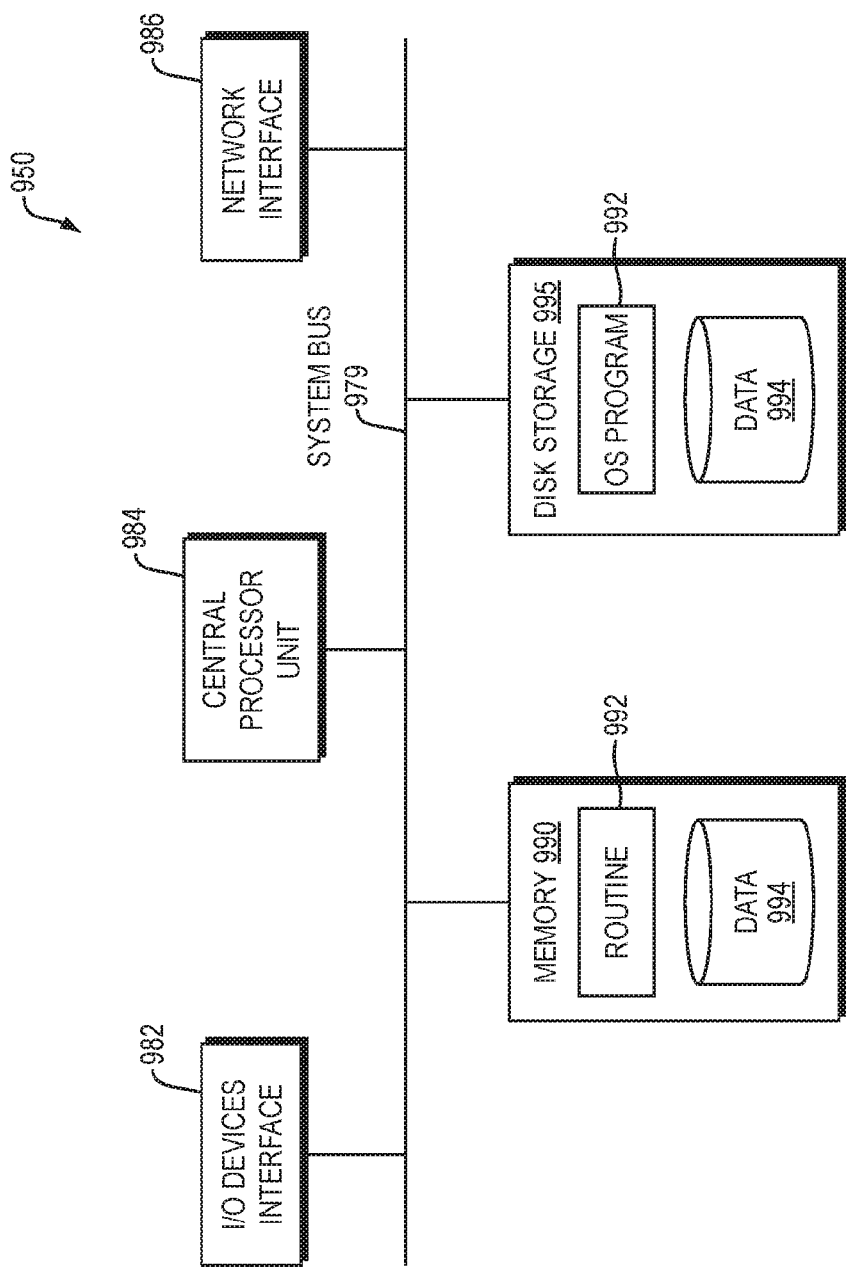
FIG. 9 is a block diagram of the internal structure of a computer in which various embodiments of the present invention may be implemented.

FIG. 9 is a block diagram of the internal structure of a computer 950 in which various embodiments of the present invention may be implemented. The computer 950 contains a system bus 979, where a bus is a set of hardware lines used for data transfer among the components of a computer or processing system. Bus 979 is essentially a shared conduit that connects different elements of a computer system (e.g., processor, disk storage, memory, input/output ports, network ports, etc.) that enables the transfer of information between the elements. Attached to system bus 979 is I/O device interface 982 for connecting various input and output devices (e.g., keyboard, mouse, displays, printers, speakers, etc.) to the computer 950. Network interface 986 allows the computer 950 to connect to various other devices attached to a network. Memory 990 provides volatile storage for computer software instructions 992 (e.g., instructions for the process 380 of FIG. 3B for fraud analysis) and data 994 used to implement an embodiment of the present disclosure. Disk storage 995 provides non-volatile storage for computer software instructions 992 and data 994 used to implement an embodiment of the present invention. Central processor unit 984 is also attached to system bus 979 and provides for the execution of computer instructions.

In one embodiment, the processor routines 992 (e.g., instructions for the process 380 of FIG. 3B for fraud analysis) and data 994 are a computer program product (generally referenced 992), including a computer readable medium (e.g., a removable storage medium such as one or more DVD-ROM's, CD-ROM's, diskettes, tapes, etc.) that provides at least a portion of the software instructions for the invention system. Computer program product 992 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 9 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for detecting fraud on a communication network, the method comprising:
    collecting call detail records on a communication network for a given time period, each call detail record containing a plurality of call features for a call to a destination number;

aggregating the plurality of call features from each of the collected call detail records by destination number, resulting in an aggregation of call features for each destination number;

transforming each aggregation of call features into a data point using a dimension reduction method, resulting in a plurality of data points, each data point representing a respective aggregation of call features for a destination number;

performing a clustering analysis that groups the plurality of data points into two clusters, and labels each aggregation of call features as fraud or non-fraud based on the cluster of each respective data point;

performing supervised learning using each of the labeled aggregations of call features as training data to generate at least one decision model to detect fraudulent calls;

detecting fraudulent calls on the communication network using the at least one decision model; and causing an automated action based on the detection.

2. The method of claim 1 further including filtering the collected call detail records based on one or more predetermined rules to remove at least some call detail records of non-fraudulent calls.

3. The method of claim 1 wherein the plurality of call features for each of the collected call detail records is aggregated by a source number and a destination number combination over the given time period.

4. The method of claim 1 wherein performing a clustering analysis further includes requiring the two clusters of data points to be a given distance apart.

5. The method of claim 4 wherein the automated action is reporting the detected fraudulent calls to an operator of the communication network, and the method further comprises adjusting the given distance based on feedback from the operator.

6. The method of claim 5 further comprising adjusting the generated at least one decision model based on the adjusted given distance.

7. The method of claim 1 wherein the automated action is blocking calls to destination numbers corresponding to the detected fraudulent calls.

8. The method of claim 1 wherein the automated action is only performed if a predetermined threshold of detected fraudulent calls is reached or exceeded.

9. The method of claim 1 further comprising displaying a graph of the data points after the clustering analysis is performed.

10. A system for detecting fraud on a communication network, the system comprising:
a fraud analysis module configured to:
accept call detail records from a communication network for a given time period, each call detail record containing a plurality of call features for a call to a destination number,
aggregate the plurality of call features from each of the call detail records by destination number, resulting in an aggregation of call features for each destination number,
transform each aggregation of call features into a data point using a dimension reduction method, resulting in a plurality of data points, each data point representing a respective aggregation of call features for a destination number,
perform a clustering analysis that groups the plurality of data points into two clusters, and labels each aggregation of call features as fraud or non-fraud based the cluster of each respective data point, and
perform supervised learning using each of the labeled aggregations of call features as training data to generate at least one decision model to detect fraudulent calls; and
a fraud detection module communicatively coupled to the fraud analysis module and configured to:
receive the generated at least one decision model from the fraud analysis module,
detect fraudulent calls on the communication network using the at least one decision model, and
cause an automated action based on the detection.

11. The system of claim 10 wherein the fraud analysis module is further configured to filter the accepted call detail records based one or more predetermined rules to remove at least some of the call detail records of non-fraudulent calls.

12. The system of claim 10 wherein the plurality of call features for each of the accepted call detail records is aggregated by a source number and a destination number combination over the given time period.

13. The system of claim 10 wherein the clustering analysis further includes requiring the two clusters of data points to be a given distance apart.

14. The system of claim 13 wherein the automated action is reporting the detected fraudulent calls to an operator of the communication network, and the fraud detection module is further configured to adjust the given distance based on feedback from the operator.

15. The system of claim 14 wherein the fraud detection module is further configured to adjust the at least one decision model based on the adjusted given distance.

16. The system of claim 10 wherein the automated action is blocking calls to destination numbers corresponding to the detected fraudulent calls.

17. The system of claim 10 wherein the automated action is only performed if a predetermined threshold of detected fraudulent calls is reached or exceeded.

18. The system of claim 10 wherein the fraud analysis module is further configured to display a graph of the data points after the clustering analysis is performed.

* * * * *